United States Patent
Sharp (10) Patent No.: US 12,413,085 B2
(45) Date of Patent: Sep. 9, 2025

(54) MOBILE SOLAR POWER UNIT CONTROL SYSTEM

(71) Applicant: Ecoquip Australia Pty Ltd., Henderson (AU)

(72) Inventor: David James Sharp, Belmont (AU)

(73) Assignee: Ecoquip Australia Pty Ltd., Henderson (AU)

( * ) Notice: Subject to any disclaimer, the term of this patent is extended or adjusted under 35 U.S.C. 154(b) by 0 days.

(21) Appl. No.: 18/039,296

(22) PCT Filed: Oct. 27, 2021

(86) PCT No.: PCT/AU2021/051250
§ 371 (c)(1),
(2) Date: May 30, 2023

(87) PCT Pub. No.: WO2022/115898
PCT Pub. Date: Jun. 9, 2022

(65) Prior Publication Data
US 2024/0006903 A1    Jan. 4, 2024

(51) Int. Cl.
*H02J 7/00* (2006.01)
*H02J 7/35* (2006.01)
(Continued)

(52) U.S. Cl.
CPC .............. *H02J 7/0068* (2013.01); *H02J 7/35* (2013.01); *H02J 13/00002* (2020.01);
(Continued)

(58) Field of Classification Search
CPC ............... H02J 7/0068; H02J 13/00022; H02J 13/00002; H02J 7/35; H02J 2300/26;
(Continued)

(56) References Cited

U.S. PATENT DOCUMENTS 5,785,280 A    7/1998  Baghdasarian
5,969,501 A   10/1999  Glidden et al.
(Continued)

FOREIGN PATENT DOCUMENTS

AU    2021221489 A1    6/2022
CN      203491963 U    3/2014
(Continued)

OTHER PUBLICATIONS

Communication from Foreign Application—International Preliminary Report on Patentability, regarding International Application No. PCT/AU2021/051250, dated Mar. 7, 2023.
(Continued)

*Primary Examiner* — Carlos Amaya
(74) *Attorney, Agent, or Firm* — Ryan D. Jenlink; Conley Rose, P.C.

(57) ABSTRACT

A mobile solar power unit control system providing power to an associated equipment item comprising: at least one mobile solar power unit comprising an assembly of interconnected solar collector panels; an energy storage module connected to receive power from the assembly of interconnected solar panels; and a control system for controlling operation of both the energy storage module and associated equipment item. The control system comprises a local controller onboard or proximate the at least one mobile solar power unit and a remote controller, communicable with the local controller, located remotely from said at least one mobile solar power unit. The mobile solar power unit conveniently provides power for an associated equipment item and any selected auxiliary loads located in an off-grid location.

30 Claims, 6 Drawing Sheets

(51) Int. Cl.

| | | |
|---|---|---|
| *H02J 13/00* | (2006.01) | |
| *H02S 10/40* | (2014.01) | |
| *H02S 40/38* | (2014.01) | |
| *H05B 45/325* | (2020.01) | |
| *H05B 47/11* | (2020.01) | |
| *H05B 47/16* | (2020.01) | |

(52) U.S. Cl.
CPC ........ *H02J 13/00022* (2020.01); *H02S 10/40* (2014.12); *H02S 40/38* (2014.12); *H05B 45/325* (2020.01); *H05B 47/11* (2020.01); *H05B 47/16* (2020.01); *H02J 2300/26* (2020.01)

(58) Field of Classification Search
CPC ......... H02S 10/40; H02S 40/38; H05B 47/11; H05B 47/16; H05B 45/325
See application file for complete search history.

(56) References Cited

U.S. PATENT DOCUMENTS

| | | | |
|---|---|---|---|
| 7,492,120 B2 | 2/2009 | Benn et al. | |
| 8,915,474 B1 | 12/2014 | Baghdasarian et al. | |
| 10,737,583 B2 | 8/2020 | Johnsen | |
| 2005/0092356 A1 | 5/2005 | Sakai | |
| 2011/0036344 A1 | 2/2011 | Jain | |
| 2012/0020084 A1 | 1/2012 | Lampon | |
| 2012/0073885 A1 | 3/2012 | Glynn | |
| 2012/0112640 A1* | 5/2012 | Maxik | H05B 47/125 315/152 |
| 2012/0206087 A1 | 8/2012 | Carpoff | |
| 2012/0243214 A1 | 9/2012 | Richmond | |
| 2012/0291847 A1 | 11/2012 | Rowe, Jr. | |
| 2015/0021990 A1* | 1/2015 | Myer | F21V 29/83 362/183 |
| 2017/0332199 A1 | 11/2017 | Elliott et al. | |
| 2018/0266637 A1* | 9/2018 | Curlett | H01M 10/6554 |
| 2019/0393826 A1* | 12/2019 | Lai | H02S 40/32 |
| 2020/0217877 A1* | 7/2020 | Adest | G01D 4/004 |

FOREIGN PATENT DOCUMENTS

| | | |
|---|---|---|
| CN | 204206099 U | 3/2015 |
| CN | 104831658 A | 8/2015 |
| CN | 110304273 A | 10/2019 |
| CN | 209667396 U | 11/2019 |
| DE | 3215431 A1 | 10/1983 |
| EP | 1528255 A2 | 5/2005 |
| EP | 1613861 A2 | 1/2006 |
| WO | 2004090327 A2 | 10/2004 |
| WO | 2007039732 A2 | 4/2007 |
| WO | 2014209420 A1 | 12/2014 |
| WO | 2017068413 A1 | 4/2017 |
| WO | 2017165913 A1 | 10/2017 |
| WO | 2017200627 A1 | 11/2017 |
| WO | 2021119733 A1 | 6/2021 |
| WO | 2022115898 A1 | 6/2022 |

OTHER PUBLICATIONS

Communication from Foreign Application—International Search Report and Written Opinion of the International Searching Authority, regarding International Application No. PCT/AU2021/051250, dated Nov. 30, 2021, 10 pages.

Communication from Foreign Application—Second Written Opinion of the International Searching Authority, regarding International Application No. PCT/AU2021/051250, dated Nov. 7, 2022, 5 pages.

* cited by examiner

MOBILE SOLAR POWER UNIT CONTROL SYSTEM

CROSS REFERENCE TO RELATED APPLICATIONS

This application is a filing under 35 U.S.C. 371 of International Application No. PCT/AU2021/051250, filed Oct. 27, 2021, entitled "A Mobile Solar Power Control Unit," which claims priority to Australian Patent Application No. 2020904465, filed Dec. 2, 2020, which applications are incorporated by reference herein in their entirety.

FIELD OF THE INVENTION

The invention relates to a mobile solar power unit control system which may be used, for example, to provide power to a light mast or communications antenna in an off-grid location.

BACKGROUND ART

The following discussion of the background art is intended to facilitate an understanding of the present invention only. The discussion is not an acknowledgement or admission that any of the material referred to is or was part of the common general knowledge as at the priority date of the application.

Supplying power to an off-grid location may appear to be a straightforward matter, especially in locations benefiting from high sunlight or high wind speeds, both being recognised sources of renewable power. However, the task is more challenging than it first appears. While solar panels, for example, may be transported to a required location—assuming the presence of road infrastructure or a sufficiently rugged transport device—power must still be generated efficiently and at the correct voltage. This requires deployment of an assembly of solar panels—desirably by a single operator—in a short timeframe in what may be a remote harsh environment. Force to be supplied by an operator to deploy an assembly of solar panels is typically greater than 20 kg, above acceptable limits for ease of operation.

The Applicant has addressed the above issue, as described in co-pending Australian Provisional Application No. 2019904880, the contents of which are hereby incorporated herein by reference, through its mobile solar power unit comprising: (a) a transport device having a cross-sectional area; and (b) an assembly of a plurality of inter-connected solar collector panels for providing, in use, power to an associated equipment item such as a light mast or communications antenna. The assembly of solar collector panels is inter-connected by rotatable connection means, advantageously spring assisted hinges, for rotating the solar panels allowing both storage of the assembly of inter-connected solar collector panels and deployment of the solar collector panel assembly to a collection position to generate power when exposed to sunlight. Conveniently, the spring assisted hinges include balancing spring(s)—such as spiral springs—which, through augmentation by spring force act to minimise effort required by an operator to manually deploy solar collector panels—an assembly of three inter-connected solar collector panels being preferably being used—and provide a counterbalance to the weight of the solar panel amongst other advantages.

The Applicant's mobile solar panel unit—in its current form—is a fixed position installation without a mechanism for moving solar panels, once deployed, to optimal position during the course of a day or a season. This reduces capital and operating costs and increases endurance of the unit in rugged conditions, but it does represent a compromise.

A further compromise, in terms of the operation of equipment powered by a mobile solar panel unit, concerns non-optimal operation. As, for example referenced in US Patent Publication No. US 20200217877, a conventional installation of solar power system includes several solar panels connected in series to form a string of panels. Leads from each solar panel are connected to a maximum power point tracking (MPPT) module. The power output of each solar panel, which is equal to the product of current and voltage ($P=I*V$), varies depending on the voltage drawn from the source. At a certain current and voltage, the power output reaches its maximum. It is desirable to operate a power generating cell at this maximum power point. The MPPT determines this point and operates the solar power system at this point so as to draw the maximum power output from the solar panels.

US 20200217877 goes on to consider that various environmental and operational conditions impact power output from solar panels. Such factors include the solar energy incident on various panels, ambient temperature and other factors impact the power extracted from each panel. Depending on the number and type of panels used, the extracted power may vary widely in the voltage and current. Changes in temperature, solar irradiance and shading, either from near objects such as trees or far objects such as clouds, can cause power losses. Owners and even professional installers find it difficult to verify the correct operation of the system. US 20200217877 goes on to note that, with time, many more factors, such as aging, dust and dirt collection and module degradation affect the performance of a solar array.

US 20200217877 discloses a monitoring system for distributed DC power installation in which solar panels are monitored and faults within the solar panels detected.

Other prior solar power systems also concern optimisation of power generating cells and may also consider issues such as DC to AC conversion so that excess power may be supplied to a grid or fault detection within solar panels or AC to DC conversion so that an LED based lighting apparatus can take power from a grid.

The Applicant has found that commercially available power control systems for solar panel units are typically designed for use in a range of different applications without particular reference to on-grid or off-grid applications. So, while conventional power control systems may provide acceptable performance in providing basic battery management system control functionality, such as maximum power point tracking (MPPT) control, their performance as a 'one size fits all' solution for many applications hinders their use in specific applications, for example, lighting applications where the operator is seeking maximum performance of the powered equipment and not just efficient battery system management, important though that issue is.

It is an object of the present invention to provide a mobile solar power unit control system suited to off-grid locations that provides flexible and more optimal control over both operation of the energy storage module and an associated equipment item (and any auxiliary loads) powered from the energy storage module.

SUMMARY OF INVENTION

With this object in view, the present invention provides a mobile solar power unit control system providing power to an associated equipment item comprising: at least one mobile solar power unit comprising an assembly of interconnected solar collector panels; an energy storage module connected to receive power from the assembly of interconnected solar panels; and a control system for controlling operation of both the energy storage module and associated equipment item, wherein said control system comprises a local controller onboard or proximate the at least one mobile solar power unit and a remote controller, communicable with the local controller, located remotely from said at least one mobile solar power unit. The mobile solar power unit conveniently provides power for an associated equipment item and any selected auxiliary loads located in an off-grid location.

The remote controller, conveniently a master controller, may communicate with the local controller through a wireless communications network (which may, for example, have 4G, 5G or Wi-Fi capability) As alluded to above, mobile solar power units—for example solar trailers—are desirably operated by a single operator in a potentially harsh environment. The operator may have responsibility for a number of mobile solar power units and is unlikely to have technical expertise across a number of skillsets: electrical, mechanical, communications and so on. A remotely located master controller—perhaps located within a geographically distant control centre or base station controlling operation of one or a fleet of mobile solar power units—conveniently compensates for operator technical limitations and allows for more efficient control of the mobile solar power unit, its associated equipment item(s) and any auxiliary loads through processing of data collected from the mobile solar power unit and, preferably, information resources collating information about an environment surrounding mobile solar power unit(s), e.g. weather forecast information or other almanack type information, as described below.

The control system advantageously includes hardware and software and/or firmware to control operation of the mobile solar power unit and especially the operation of the associated equipment item not just control over the energy storage module which typically comprises a plurality of batteries. The control system (and its constituent hardware, software, and firmware) is configured to optimise operation of the mobile solar power unit. Software for operating the mobile solar power unit and associated equipment item, while preferably executed by the local controller, is desirably accessible by a cloud server which conveniently enables software updates for configuring each mobile solar power unit and associated equipment item as a function of operating performance and environmental factors which may be more precisely processed by the remote controller at the remote location where a broader range of information and technical skillsets are available. Such updates may be done for one or more mobile solar power units from a remotely located control centre with the cloud server preferably having an admin portal to ensure updates by a qualified entity, whether a computer or computer system and/or personnel. A client portal may be provided to enable a user of the mobile solar power unit to modify selected operating parameters for mobile solar power unit operation. The selected operating parameters may make mobile solar power unit operation easier and more convenient without compromising its performance, which is intended to be optimised by the control system.

Software, or firmware, for operating the mobile solar power unit advantageously has a predictive capability with software being modified as necessary as a result of comparing expected operating results with actual operating results for mobile solar power unit(s) and/or as a result of relating desired associated equipment item performance with current and/or forecast or future predictions for environmental parameters, as described below, that can alter such performance if not accounted for by the control system. The control system thereby advantageously operates, in particular, through involvement by the remote controller (where necessary controlling the local controller), to optimise operation of the associated equipment item which is advantageously a lighting apparatus (such as a light mast) or communications antenna, being important infrastructure for locations including remote mine sites.

The control system may therefore also acquire, where communicated with selected sensor(s), data about current or real time operation of one or a system of mobile solar power unit(s). Such data may be logged and used by the remote controller to modify software or firmware likely implemented by the local controller to optimise mobile solar power unit operation. Data may also be logged by the local controller. In the case of a lighting apparatus, operation may also be triggered by a motion sensor or a photo-electric light on trigger. A set point light value for triggering a photo-electric light trigger may conveniently be read and tuned in real time. Other sensors may be used for triggering associated equipment item operation, such sensors being optionally selected from the group consisting of: acoustic sensors, infrared sensors, thermal sensors, proximity sensors, smoke detectors, gas level sensors, radiation sensors and automobile proximity or location sensors In the case of lighting apparatus, such as a light mast, light is preferably provided during a lighting phase by a plurality of lighting devices, preferably LED luminaires controlled through LED drivers also known as driving circuits, under supervision of the control system. LED luminaires are modular and interchangeable, for example where different luminaire colour is required. The control system may control the start and end times for the lighting phase relative to timer(s) or ambient light levels and preferably dependent on energy storage module parameters including, for example, the state of charge of the batteries. More generally, the control system advantageously determines the load shedding behaviour, for example through curve or other characteristic, for the LED luminaires dependent on energy storage module parameters such as battery depletion measured, for example, by state of charge (SOC); voltage deliverable from the solar panel assembly; and/or other factors such as time of day, weather forecasts and the configuration of a solar panel assembly or energy storage module of a selected mobile solar panel unit. A lighting control algorithm is advantageously implemented by the control system for LED driver (s) to optimise light output with respect to battery SOC to ensure reliable operation. Light output or load shed may also be determined by, or in combination with, other parameters such as time of day (for example, if the low system SOC is at 4 am for example, the system determines that sunrise is approaching, and the light will be off shortly so no need to initiate the load shedding); and upcoming weather patterns. For example, if the upcoming days have a poor weather (low per square m solar irradiation) forecast then the control system will determine that solar yield will be low so outbound current must be reduced to preserve energy storage. In contrast, if the upcoming weather is fine then the control system will determine that solar yield will be high (according to location) so load shedding is unnecessary.

Such a lighting control algorithm may include light ramp-up and/or ramp down (with controlled ramp rate, if required, noting that ramping may include dwell periods at which light output is maintained at a constant level for a duration controlled by the control system) during sunset and sunrise (or other factors affecting requirement for light output, such as rainstorms and other weather events) to conserve energy storage levels, typically battery storage levels. The control system may also record operational data for the LED luminaires and advantageously predict service life and luminaire maintenance or replacement times potentially avoiding wasted time and cost on breakdown maintenance.

The control system may through the lighting control algorithm—including for the purpose of load shedding—control dimming of the lighting apparatus, for example through pulse width modulation (PWM) control. This would involve PWM control over the drivers of LED luminaires comprised within the lighting apparatus though other dimming control methodology is not precluded. PWM dimming strategy may also be used to optimise available light output to power delivery since power delivery does not necessarily equate to light output. Therefore, adjusting the load shedding (PWM dimming) strategy to running LED luminaires at lower light output can conserve energy without substantially affecting actual light availability.

The control system may adjust the start and end times for equipment operation such as for the lighting phase and/or dimming levels of a lighting apparatus dependent on a plurality of environmental parameters selected from the group consisting of—though not limited to—information fixed by location such as geographic location of the mobile solar power unit and sunset, sunrise, moonrise and moonset times for the location of the solar power unit; dynamic information selected from the group consisting of—but not limited to—weather forecasts for the location of the mobile solar power unit; ambient light levels (as detected by a suitable photo electric sensor); sensed and logged human motion patterns around the lighting apparatus; and logged performance data, in particular recent mobile solar panel unit performance data. Environmental parameters may also include estimated or measured properties of the solar panels, such as dirt or dust build up or related drop in efficiency over time which may be made dependent on the mobile solar panel unit location. An equipment item control algorithm may be adapted to take account of variances from predicted environmental parameters, optionally in real time.

The control system may control light output from the associated equipment item, such as a lighting apparatus, having regard to environmental factors as described above. For example, it may be necessary to provide no more than a selected light output (whether determined in terms of light intensity or light wavelength) or indicate that a certain light colour or light wavelength be used for the lighting apparatus. For example, the control system may accommodate specific LED chips (for example a 36 volt LED driver to enable production of light at a desired wavelength, e.g. 590 nm)—to avoid detrimental impact on a wildlife habitat.

The control system may also provide a geofence indicating use of a particular light wavelength or preventing use of a lighting apparatus too close—i.e. outside a geofence determined by the control system—to a sensitive habitat such as a turtle breeding habitat. Further, where the wildlife has determined reproductive periods, the control system may predict this and determine a control strategy including setting of geofences or light output control measures, for example commanding a particular colour or light output—during the determined reproductive periods. The light output may be tuned dependent on other factors which may reduce wildlife susceptibility—for example predicted full-moon events where artificial lighting has less impact on wildlife, for example turtles.

Mobile solar power unit operational data is advantageously communicated from the mobile solar power unit to the remote controller with cloud-based data aggregation and hosting being preferred. This allows web-based monitoring of operational data which may be used to optimise mobile solar power unit performance. Automatic alerting based on the communicated data may also be implemented with alarms being triggered, for example, where a mobile solar power unit moves outside of an established geofence; state of charge of batteries falls below a predetermined minimum; and/or the daytime rate of battery charge is significantly different from a selected level. Implementation of a web interface allows for actions including an action selected from the group consisting of: remote reconfiguration of operating parameters; review of historic charge/discharge performance; review of solar power unit (e.g. solar trailer) fleet placement and geolocation (current and historical); solar power unit fleet assignment; performance forecasts; and emergency shutdown. Fleet assignment relates to the configuration of the mobile solar power unit, for example a mobile solar light tower (MSLT) operates very differently to a Mobile Solar Communication (MSCT) or CCTV trailer; both have very differing load profiles and run times (MSLT has high load for 12 hrs per day, MSCT has a much lower load but runs 24/7) Further, MSLT load can typically be manipulated to conserve power draw whereas an MSCT is likely mission critical so aside from dropping non critical circuits (e.g. cameras) the load is a given and must typically be maintained.

Desirably, the remote controller may execute an action onboard the mobile solar power unit potentially exclusively of the operator and local controller. This may involve a degree of automation conveniently addressing an issue that certain types of fault have previously required a technician to travel significant distances to rectify minor faults, for example, such as an electrical reset. The control system may therefore be programmed to rectify such minor faults whilst saving significant time and appreciable cost in technician travel. The control system can conveniently be programmed with predetermined fault scenarios and responsive control actions.

The control system is preferably configured to assist operators of the mobile solar system, for example by identifying conditions in which the solar panels are incorrectly oriented for the geographical location in which the mobile solar power unit is located. GPS location and movement reporting capability is desirably provided and geofencing may be implemented with system parameter changes conveniently being automatically uploaded in predetermined geofenced areas). The control system may access logistics control systems to optimise deployment of mobile solar power unit(s).

The local controller may also be connected to a positioning device which may include a compass orientation device, such as an inbuilt accelerometer which compensates for true North. Orientation is input to the control system which may provide an alarm or options for corrective action to an operator, for example through a human machine interface as referenced below, if the orientation of the solar panels is incorrect for the detected location. Alarms and corrective action can also be issued and commanded remotely by the remote controller.

Typically, operators—and permitted personnel who may be identified by a password, pin access code or smart card, RFID device or like device communicable with the control system—would be enabled to interact with the control system for a selected mobile solar panel unit to manually control its operation within limited conditions programmed into the control system by manually adjusting permitted operating parameters. Examples of such a limited condition is a battery change or an available control response to the occurrence of an event unpredicted by the control system in the vicinity of the mobile unit that could affect operation of the mobile solar power unit, solar panel assembly and/or associated equipment item. However, automatic adjustment of operating parameters by the mobile solar power unit control system—desirably involving operation of the remote controller—is preferred as this may be more efficiently based on data either not available or not readily available to the operator; or may rely on further computer processing of operating parameter data to determine an optimal mobile solar system operating strategy. Optimal operation may be measured by minimising cost of operation of the associated equipment item which is achieved using a control system as above described. Further, such operation may be optimised not just for a single mobile solar power unit but for a fleet of mobile solar power unit(s) which may conveniently be controlled by the same remote controller.

The energy storage module desirably includes a plurality of batteries conveniently located in a battery rack within a mobile solar panel unit. Each battery (e.g. 48 volts rated, though 12 volts, 24 volts and, in selected wildlife protection applications 36 volts, may be used; a 48 volt battery may also via individual DC/DC converters supply 12 volts, 24 volts or 36 volts) may be connected in a parallel with provision of an individual operator accessible circuit breaker allowing safe swapping of batteries in the field. Such swapping is possible without any interruption to the required power supply driving the associated equipment item (especially important where this is a communications antenna). The local controller is conveniently selected for energy storage module control though the remote controller may modify operation of the local controller or override the local controller under certain operating conditions. In any event, the control system conveniently provides battery charging cycle and discharge cycle control. The local controller may determine power harvested by the solar panel assembly and output by the energy storage module as a measure of efficiency.

The local controller should include a battery management system with maximum power point tracking (MPPT) control module(s) with the object of drawing maximum power output from the solar panel assembly and charging the batteries of the energy storage module efficiently so that the associated equipment item operates efficiently. It is highly advantageous for an MPPT control module to be individually provided for each solar panel. Having each individual panel matched to its own MPPT control module allows use of each panel to be optimised. For example, if there is partial shading on one panel the whole system is not affected, two panels still run at 100% with only the one "shaded" panel effected; this may change throughout the day as the sun moves through its axis if the mobile solar power unit is placed in a heavily built up area so having each panel matched to its own dedicated MPPT control module means solar yield is optimised to actual solar irradiation availability, even if not ideal, Additionally if there is an issue with one solar panel or MPPT, only that solar panel is affected so the system will still operate at say 66% whilst a maintenance team time works on the issue.

The battery management system would also typically include circuit protection to balance batteries and avoid thermal runaway and other known battery hazards.

The local controller is desirably housed in a compartment or cabinet provided in or on the mobile solar power unit which is both weather and environmentally resistant. The local controller could also be provided within a portable computing device such as a laptop computer or smartphone available to an operator of the mobile solar panel unit. The local controller desirably comprises components selected from the following set of components: microcontroller and microprocessor, communications interface electrical converters and associated equipment driving circuits or drivers for controlling operation of the energy storage module and associated equipment item. These components may be embodied in hardware, software, firmware or any combination of these to achieve the required duty of the local controller.

The mobile solar power unit control system conveniently includes one or more sensors connected—whether through wireless or wired connections—to the control system (whether to the local or remote controller with option for sensors to be independently connected to both remote and local controllers). Sensors may be selected for detecting environmental and system conditions such as ambient light level and ambient temperature as well as solar panel reflectivity, energy storage module temperatures and other mobile solar power unit operational data required for the control system to optimise mobile solar power unit(s) operation. Using such sensors allows the system to detect faults within the solar panel assembly or energy storage module.

Desirably, the associated equipment item—such as a light mast or communications mast—is provided with DC power. This allows, in the case of a light mast cost effective LED luminaires, and in any event avoids the need for DC to AC conversion and avoids known hazards associated with AC systems and which are well known in the electrical arts.

The energy storage module may supply power to accessory equipment items (or auxiliary loads) such as communications equipment and cameras. For example, the associated equipment item may be monitored by a camera for security or other purposes. In such case, the camera is conveniently provided with power by the energy storage module, with camera operation being controlled by the control system. The camera, which may be separate from, or integrated with, the associated equipment item, may stream video over the communications network to the remote controller and/or a client control system which may be communicated with the administrative portal. Operation of the camera may be triggered by a signal from a sensor, for example a motion sensor detecting motion in the vicinity of the associated equipment item, and/or a command from the control system whether input through the administrative or client portal. Camera operation may also be turned on or off according to parameters such as time of day or night or sensed motion. Captured video or images may be stored in a database for later viewing.

Another factor to consider is that DC electricity derived from the solar panel assembly (and battery rack) may not be correctly matched with power requirements for the associated equipment item or selected auxiliary loads. Therefore, DC-DC converter(s) whether of boost, buck or buck-boost type may be included within the local controller to enable efficient matching of available power to the load requirements and, in particular, any required constant voltage requirement. For example, where a camera (or other auxiliary load) requires a constant voltage that the batteries—due to their variable voltage delivery range—cannot provide, a suitable DC-DC converter (whether boost, buck or buck-boost) or system of DC-DC converters allows voltage to be stepped up/down to enable camera operation. A separate DC-DC converter or system of DC-DC converters is conveniently provided for each auxiliary load requiring a constant voltage. For example, the system of DC-DC converters may include 48-48 v, 48-24 v and 48-12 v converters.

The mobile solar power unit control system allows efficient power to be directed to an associated equipment item in an off-grid location though may be used in cases even where there is a local grid. The control system enables a high degree of control over operation of the associated equipment item while still enabling efficient and effective control over operation of the energy storage module.

BRIEF DESCRIPTION OF THE DRAWINGS

Further features of the mobile solar power unit control system of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF PREFERRED EMBODIMENTS

Figure 1:
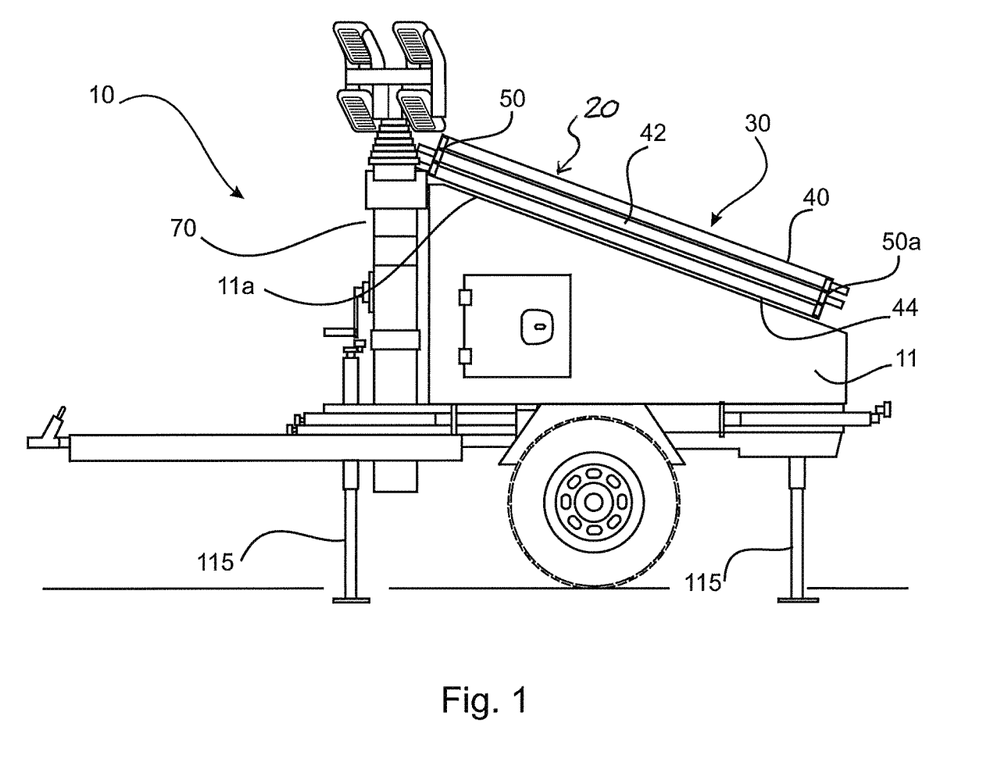
FIG. 1 is a schematic side view of a mobile solar power unit with an assembly of solar collector panels in stored position and controlled by the control system of an embodiment of the present invention.
Figure 2:
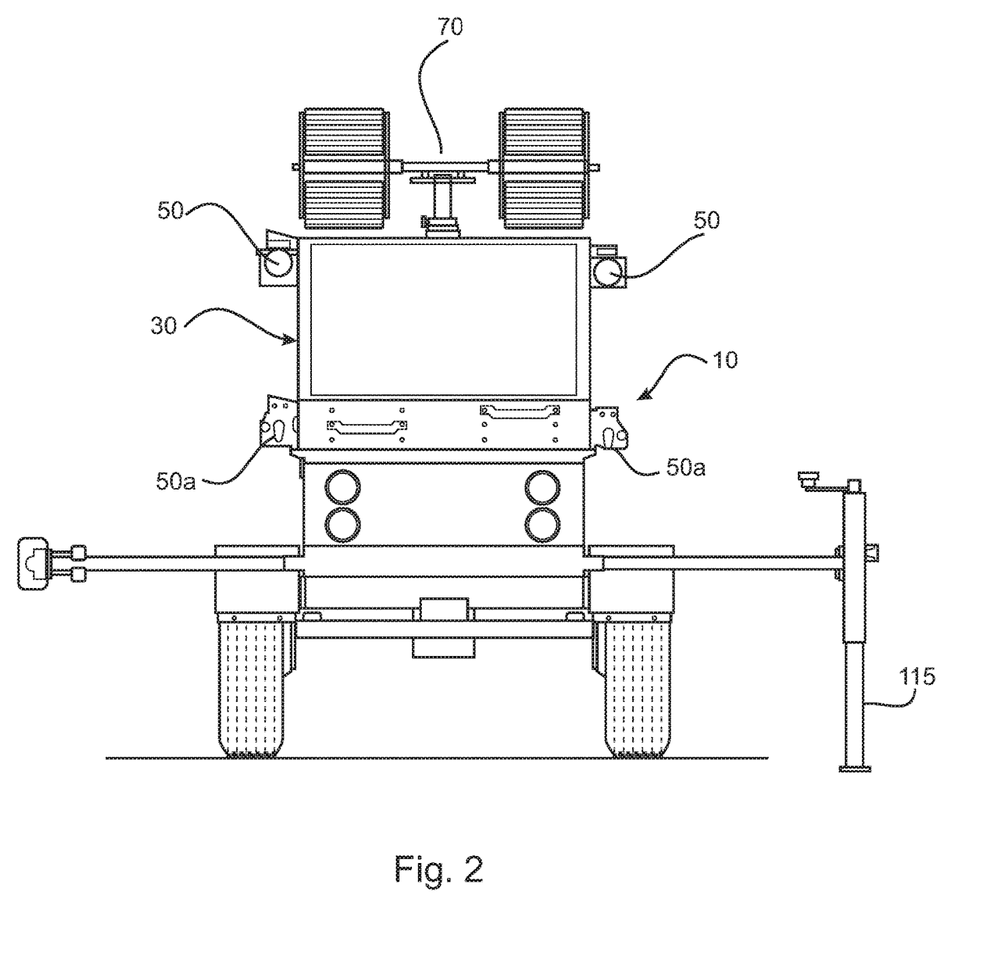
FIG. 2 is a schematic rear view of the mobile solar power unit with an assembly of solar collector panels in stored position.
Figure 3:
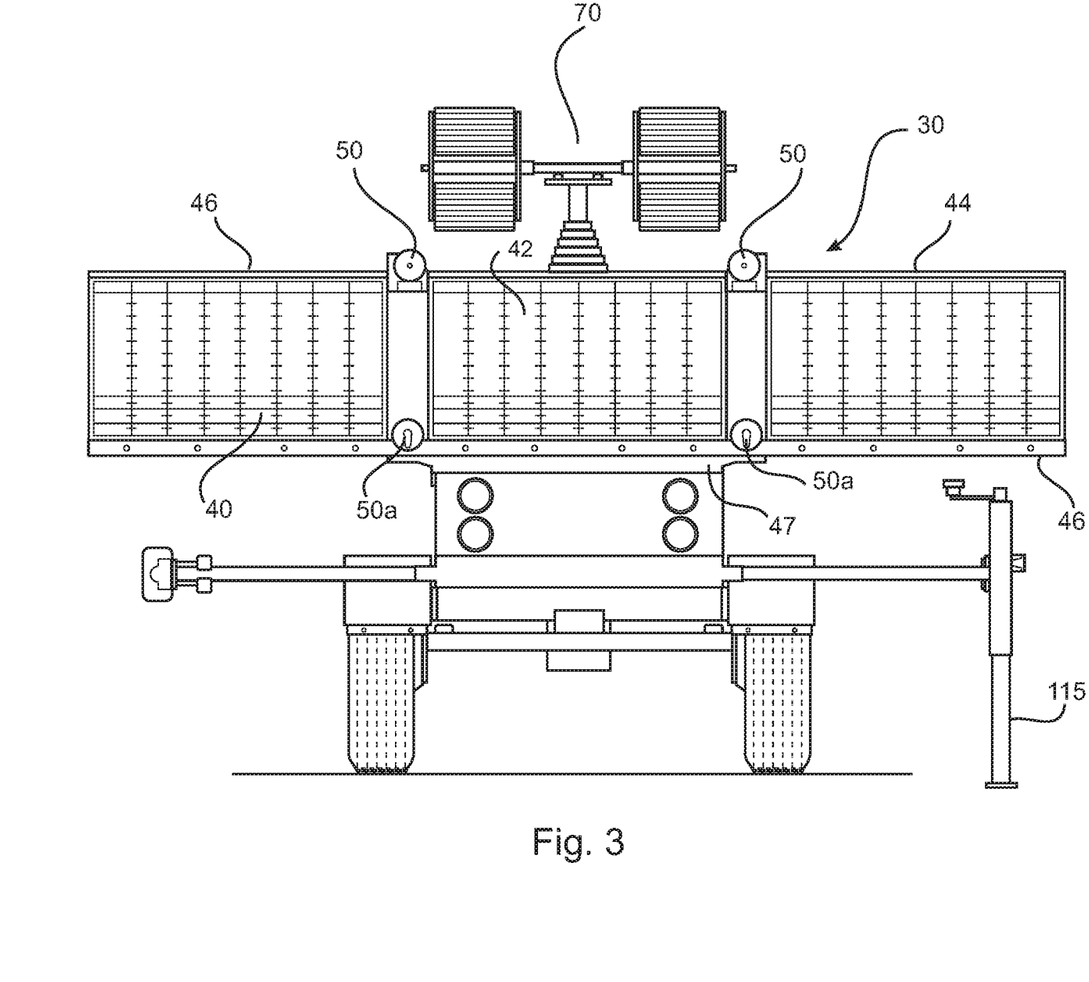
FIG. 3 is a schematic rear view of the mobile solar power unit with an assembly of solar collector panels in deployed position.

Referring to FIGS. 1 to 3, there is shown a mobile solar power unit 10, in the form of a solar trailer leased to a client mining site and operated by a single trailer operator, with a storage zone 20 neatly accommodating a solar panel assembly 30 of three inter-connected solar collector panels 40, 42 and 44 (each rated at 375 W power output) comprising a plurality of solar or photo-voltaic cells for providing power to operate a light mast 70 throwing up to 105000 lumens of controlled light from three modular LED luminaires (white or amber light as fitted by the operator dependent on lighting requirements) located at a height of say 8 m above ground.

Storage zone 20 includes an inclined surface 11a of a housing of trailer 10 to which solar panel assembly 30 is mounted through mounting block 47. The angle of inclination of surface 11a is the same as the angle at which the solar collector panels 40, 42, 44 will be deployed, as shown in FIG. 3, to collect solar energy. The angle of inclination of the solar panels 40, 42, 44 also assists in reducing dust and dirt build up on the panels.

Operation of the solar trailer 10 is controlled by a control system 200 including a local controller 220 and a remote controller or base station 250 located remotely at a significant distance from the trailer 10. For example, the trailer 10 could be located in the Pilbara region of Western Australia with local controller 220 communicating, by wireless connection including the option of communication through mobile or cellular phone, with the remote controller or base station 250 being located in a control centre in Perth, some 1200 km distant. Remote controller 250 controls operation of a fleet of solar trailers 10 each having, in this embodiment, the same design though auxiliary loads may differ dependent on client requirements.

Solar panels 40, 42 and 44 are generally similar in design being rectangular and having opposed sides. Solar panel 42 is the middle panel and is connected to each of solar panels 40 and 44 by hinge connection means including a spring assist mechanism including a pair of opposed balancing springs 50, 50a connected at the corners of the adjacent panels 40, 42, 44 and on the opposing sides 42a and 42b of solar panel 42 as shown most conveniently in FIGS. 2 and 3. Further details of solar collector panels 40, 42 and 44 and trailer 10 generally are provided in International Patent Publication No. WO2021/119733 incorporated herein by reference for all purposes.

The spring force of each balancing spring 50, 50a is selected to reduce manual effort required by an operator to either store or deploy the solar panel assembly 30. The spring force is desirably below 5 kg. In this regard, manual operation of the solar panel assembly 30 by the operator is implemented, this also having the advantage of avoiding wear or other technical issues arising from electric motor actuation. Mobile solar trailer 10 provides a fixed disposition for panels 40, 42 and 44 of solar panel assembly 30 when deployed avoiding a potentially complex mechanism for moving panels to avoid shading or to optimise exposure to sunlight.

The use of respective pairs of balancing springs assists to reduce the force further than if a single balancing spring 50 were used at each corner connection. Balancing springs 50, 50a are opposing, so—when a panel is stowed or closed, the bottom balancing springs 50a are under tension with the top balancing springs 50 free. If a panel 40 or 44 is rotated to 90 degrees, both the top and bottom balancing springs 50, 50a are free or under no tension in a "neutral" position which can be convenient for cleaning and dust/water run-off when washing the two solar panels 40 and 44 during service. In this neutral position, and any other position for that matter, the balancing springs 50, 50a have force balanced to prevent sudden movement which would create a hazard so that, even if let go by an operator, the solar panels 40, 44 will either stay in position or move only a small distance from the position in which released.

Figure 6:
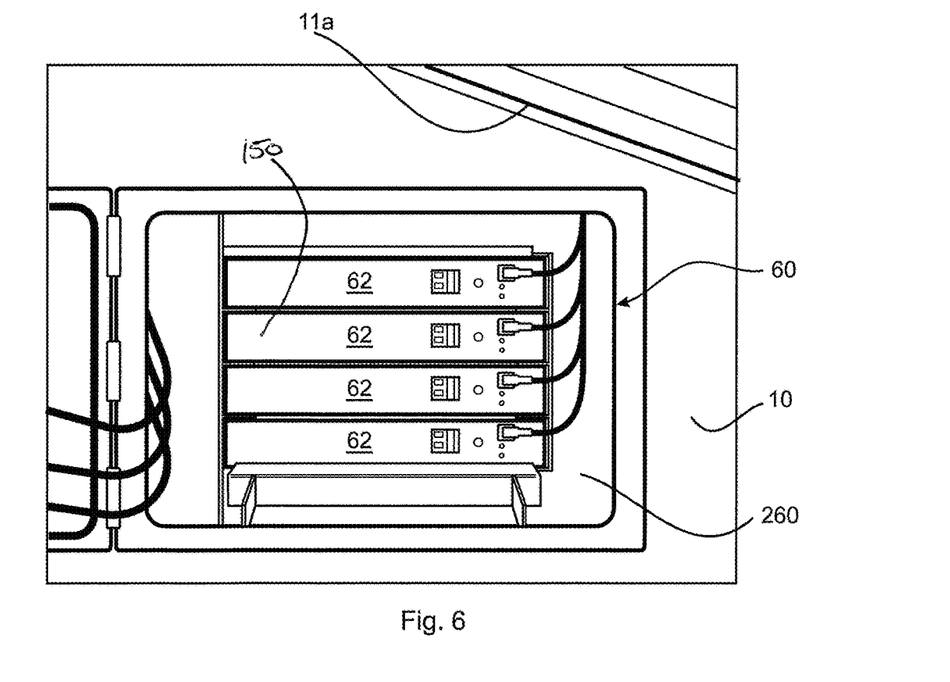
FIG. 6 is a photograph showing the battery rack for the mobile solar power unit of FIGS. 1 to 3.

When deployed, solar panel assembly 30 and the solar or PV cells of its associated solar panels 40, 42 and 44 receive sunlight and convert this into electricity through the photo-voltaic effect at very high efficiency, noting that—when deployed—none of the solar panels 40, 42, 44 shade any other of the solar panels 40, 42 and 44. Such electricity is DC and is directed to charge the energy storage module which here comprises a battery rack 60 including four replaceable battery packs connected in parallel (as are solar panels 40, 42 and 44) at a central busbar within a battery compartment 260 of solar trailer 10. The battery rack 60 may accommodate up to four battery packs 62 as shown in FIG. 6. Each battery pack 62 includes a 48 volt battery and an individual circuit breaker as well as a connection to the local controller 220. The battery cells are conveniently lithium iron phosphate (LFP) type though may also be Li-Ion or any other convenient type and are provided—where necessary—with over-temperature protection, overcharge protection and any other circuit protection as known in the battery arts. Each battery pack 62 may be located on guide rails that allow easy operator insertion and extraction of the battery packs 62 by sliding these into or out of the battery rack 60.

The battery packs 62 are able to be safely and individually swapped out in the field with no interruption to the power supply to light mast 70 or auxiliary loads as described below. The "hot" changeout is made possible and safe by actuation of the above-mentioned individual circuit breaker(s) which can be turned ON or OFF by the operator (or by remote controller 250). Control system 200 informs the operator (for example through the touch screen 270 described below) when a battery pack 62 is isolated making the battery pack 62 safe to handle and remove/replace in a service or breakdown scenario. Such battery pack 62 removal does not, in this case where battery packs 62 are connected in parallel, affect energy storage module voltage which is important for light mast 70 and auxiliary load operation. A parallel arrangement of battery packs 62 also matches the parallel arrangement of solar panels 40, 42 and 44 avoiding electrical hazards associated with connecting solar panels in series. Further, a parallel arrangement of battery packs 62 allows "hot" changeout such that, if one battery pack 62 fails, that battery pack 62 can be isolated (either onsite or remotely by base station 250) and replaced without the overall system voltage being affected as would occur in a series parallel system (with four 12V batteries to achieve 48 V output).

Solar trailer 10 is otherwise of conventional design and is not further described in detail familiar to the person skilled in the art of trailer design and manufacture.

Figure 7:
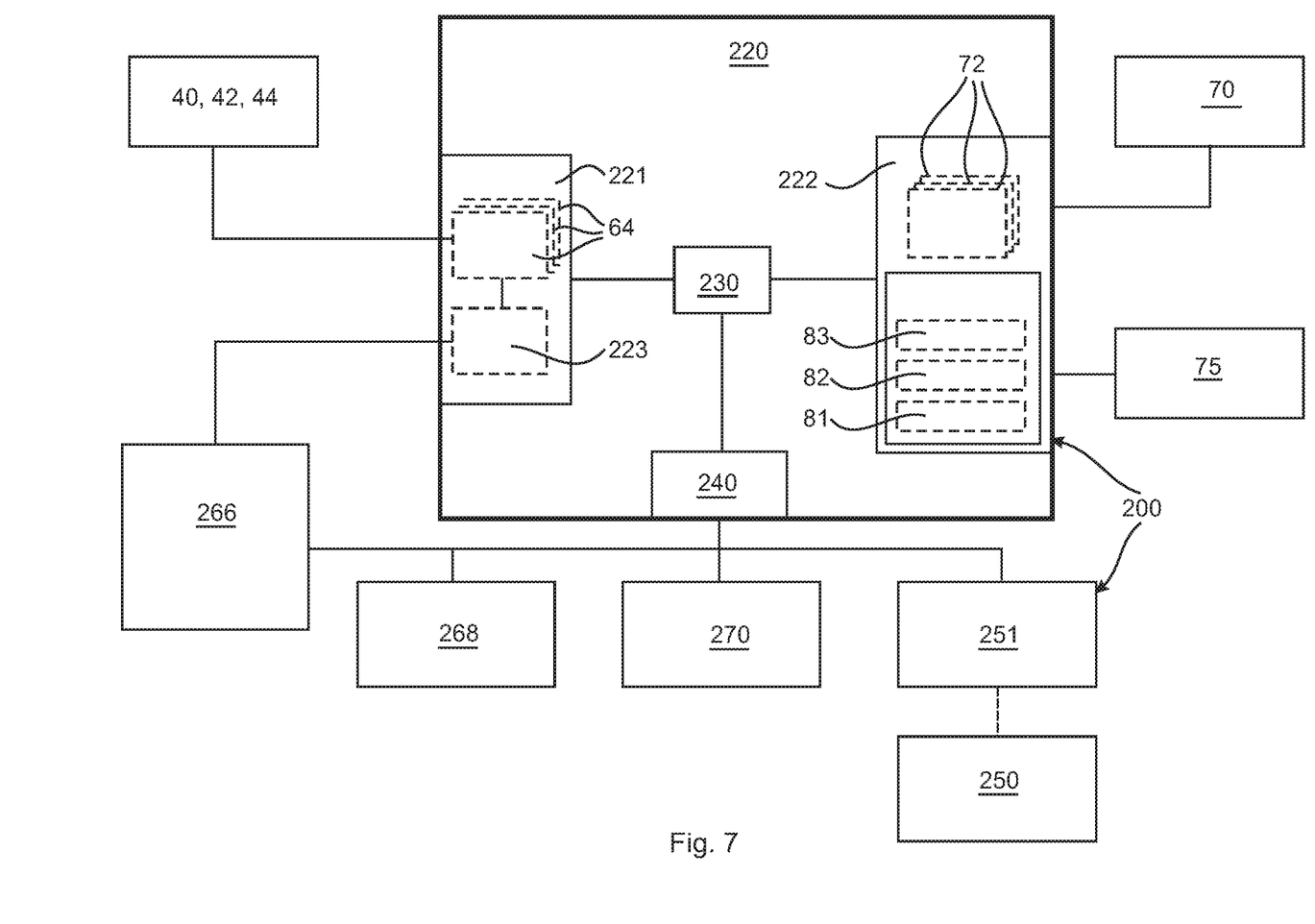
FIG. 7 is a block diagram illustrating a control system for the mobile solar power unit shown in FIGS. 1 to 3.

Local controller 220, which is provided on a main board located within a control compartment of solar trailer 10, comprises a microcontroller unit (MCU) 230 and a microprocessor 240 which interface between a power block 221 and output block 222 of the local controller 220 as schematically illustrated in FIG. 7.

The main board of local controller 220 is a single integrated PCB comprising in this exemplary embodiment: the power block 221 including three MPPTs 64 each individually supporting one of solar panels 40, 42 and 44 of solar panel assembly 30 and a system power block 223; and the output block 222 including three LED drivers 72 configured for white light requirements; one 48V DC-DC converter 81; an arrangement of DC-DC converters including one 24V DC-DC converter 82; one 12V DC-DC converter 83; the MCU 230 and the microprocessor 240. The three converters (48V, 24V and 12V; 81, 82, 83) are configured in parallel allowing the energy storage module or battery rack 60 and its battery packs 62 to produce required power for external equipment 75 auxiliary loads (unlike the LED luminaires) requiring a constant voltage—here a camera and communications antenna—which the battery rack 60 cannot directly provide for reasons described below—without exceeding any component capacities and allows the local controller 220 to generally operate more efficiently with lower heat generated. The main board of local controller 220 is provided with auto reset, solid state circuit protection which has no moving parts and allows for an intermittent fault to be rectified internally so that, for example, if there is a current inrush the system will disconnect providing the required protection without need to be visited by a technician to reset instead doing this automatically. If the fault is permanent and continues, the above-described sub-components on the main board have short circuit detection integrated into them as well and disable outputs on fault detection.

The single integrated PCB main board of local controller 220 reduces connection-point failure opportunities, reduces the profile of the local controller 220 and reduces production costs. Better heat management is also possible due to more flexibility on placement of heat-generating components. A single integrated board can also be made more rugged to sustain more vibration and shock without damage.

Figure 4:
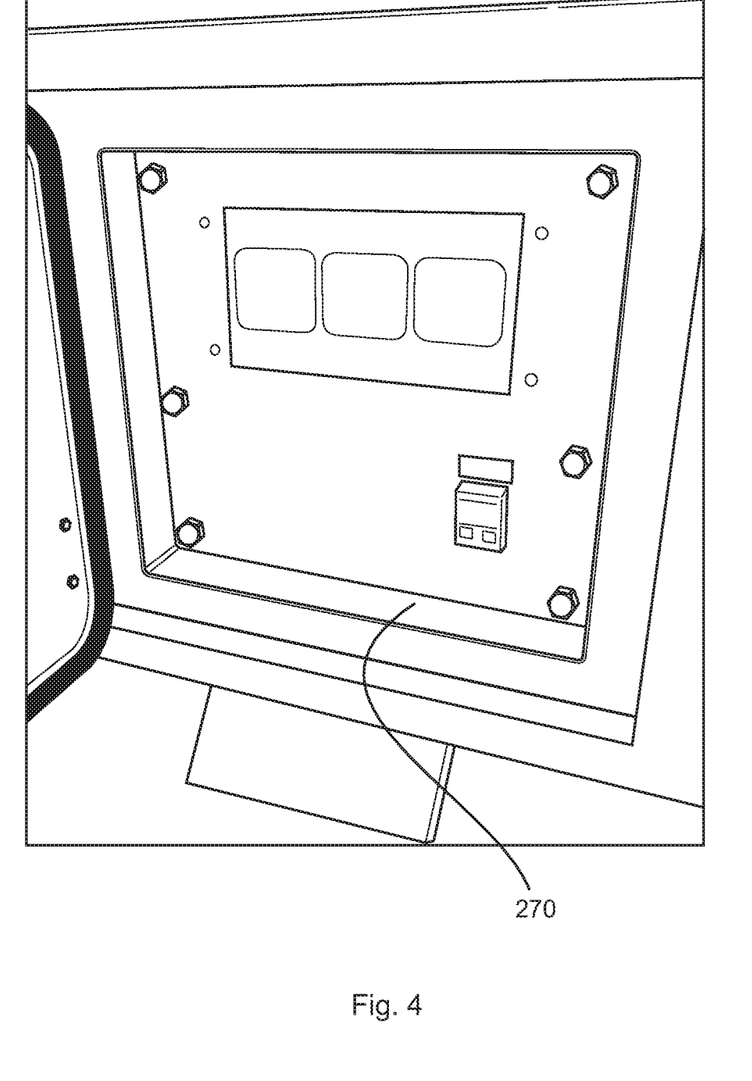
FIG. 4 is a photograph showing the control panel (human machine interface, HMI) for the mobile solar power unit of FIGS. 1 to 3.
Figure 5:
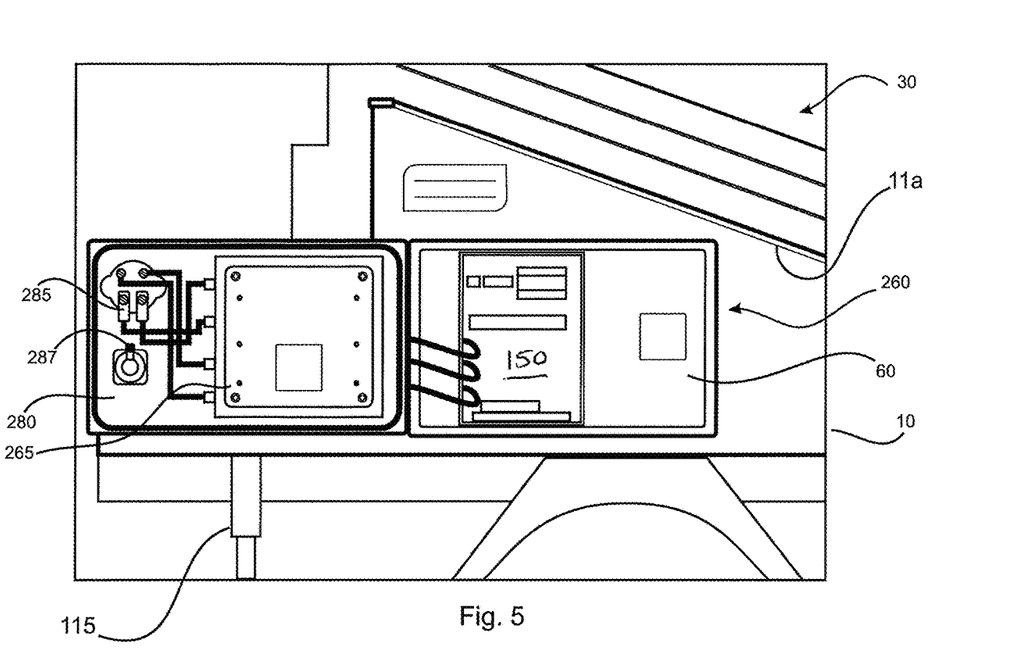
FIG. 5 is a photograph showing the inside of a door to the compartment accommodating the control panel and battery rack for the mobile solar power unit of FIGS. 1 to 3.

The main board of local controller 220 is located within a compartment 260 of solar trailer 10 as shown in FIGS. 4 to 6 accommodated in a case 265 that is solid and durable and which assists in heat dissipation. The case 265 may be a sand-casted case using aluminium. This provides several advantages, such as natural heat dissipation via aluminium, the ability to customise size for best possible fit in the solar trailer 10, the ability to customise shape for optimising heat transfer and the ruggedness of cast aluminium. A thermally conductive foam layer, with vibration-dampening and electrical isolation characteristics, may be fitted between the case 265 and the main board, facilitating heat transfer from the main board components—as above described—to the aluminium case to be diffused into the ambient air. The foam layer may be cut to shape from foam sheets. A suitable foam may have a heat transfer rate more than 20 times that of ambient air.

The MCU 230 provides maximum power point tracking (MPPT) functionality to control the battery charge cycle with the object of drawing maximum power output from each panel 40, 42, 44 of the solar panel assembly 30 to charge electric cells, of conventional type, within an energy storage module 150 of the mobile solar panel unit 10. To this end, MCU 230 is programmed with a multi-stage adaptive charge algorithm controlling bulk, absorption and float stages of the charge cycle.

During bulk stage, MCU 230 commands delivery of a charge current at 54V DC to rapidly charge each battery. When the battery voltage reaches absorption voltage setpoint, MCU 230 activates the absorption stage.

During absorption stage, MCU 230 switches to a constant voltage mode, where a pre-set absorption voltage—for the batteries of this embodiment 57.6V DC— is applied. When the charge current decreases below the tail current and/or a pre-set absorption time has elapsed, the MCU 230 determines that each battery is fully charged. MCU 220 switches to the float stage as soon as the battery voltage hits 57.6V.

During float stage, float voltage here of 55.2V DC, is applied to each battery to maintain a fully charged state. When load is applied through the light mast 70 or auxiliary load, such as a camera, a battery drops below the float voltage, a new charge cycle is initiated by MCU 230.

MCU 230 also controls delivery of power from system power block 223 supplying power from the MPPTs 81, 82, 83 and an auxiliary battery for powering the local controller 220 including power for battery power and communications module 266, GPS communications module 268, the touchscreen (HMI) 270 and to power wireless communications module 251 for communications with base station 250. The battery communications are via a serial comms port located on each of the battery packs 62, allowing measurement of battery cell temperatures (with irregularities creating an alarm), cell voltages and in and outbound current. The battery power and communications module 266 also provides system SOC (state of charge).

Communication through wireless communications 251 also allows the battery packs 62 to be switched on or off, for example being switched off if there was an issue in the field (i.e. excess temperatures alluding to an internal fault).

MCU 230 also provides control—in this embodiment—over outputs in terms of the operation of the light mast 70 which includes, by way of example, three modular dimmable LED luminaires rated at 400 W each, driven through three LED drivers 72 and providing a maximum illumination of up to 105000 lumens. Light mast 70 is suitable for applications such as road and construction activity, shutdowns and mobile plant maintenance and mine site haul road, traffic intersections and remote camps.

More particularly, MCU 230 controls the operation of the LED drivers 72 through PWM dimming as a direct result of logic embedded in firmware that controls power flow to the LED luminaires of light mast 70 through the LED drivers 72 as part of a lighting control algorithm described below and controls modes of operation of light mast 70 including automatic operation, manual operation and test modes. MCU 230 may also enable/disable the DC-DC converters based on configuration and/or error conditions. If an LED luminaire fails, an LED driver 72 will detect that it is supplying power but no current is passing through to the LED luminaire. MCU 230 will flag a fault condition and initiate a call for assistance. MCU 230 receives inputs from sensors including an ambient light sensor (for example a photosensitive device which may be based on a light dependent cadmium sulphide resistor) and a motion sensor which may both be used in determining the lighting control algorithm described below. As such determination may involve the computer processing capability available to base station 250, MCU 230 also interfaces with microprocessor 240 to enable communications with the base station 250.

Microprocessor 240 communicates with the remote base station 250 through a wireless communications network, for example 4G or Wi-Fi in a present embodiment with 5G a likely future embodiment. Microprocessor 240 controls peripheral communications including mobile communications 251 including with base station 250, GPS communications 268, an inbuilt compass device (which detects true North) and the HMI (touch screen) 270 as well as battery power and communications 266 including on board data storage (particularly relating to battery state of charge (SOC) and charge rate) and passing signals whether to or from the base station 250.

Microprocessor 240 has a read only memory for logging sensor readings (for example SOC, battery charge rate and ambient light level) for display and review on a touch screen 270 interfaced with the microprocessor 240 and MCU 230 and accessible by opening a door 280 to the control compartment 260 as shown in FIGS. 4 to 6. A door switch 285 enables the touch screen 270 to be turned off when not required by the operator. A second switch 287 is mounted on the door 280 so that the trailer operator is alerted if any unauthorised access events to the compartment 260 occur.

Microprocessor 240 also communicates, through the wireless network and a cloud-based system including a cloud server and any other required computer system, with the base station 250. The base station 250 conveniently coordinates modification of the firmware to optimise light mast 70 operation through updates that may be transmitted to the microprocessor 240 through the wireless network and cloud-based system for which client and admin web portal access is provided. Base station 250 coordination of firmware updates is convenient and timely, especially where the required technical expertise and computer processing capacity is not located at the solar trailer 10 location or where the base station controls a fleet of solar trailers 10.

The firmware essentially implements a control strategy to optimise operation of the solar trailer 10, the light mast 70 (and its auxiliary loads 75). To that end, firmware in this embodiment matches energy storage module conditions with light mast 70 requirements providing a lighting control algorithm which is implemented by MCU 230 to control LED driver(s) to optimise light output from the light mast 70 luminaires with respect to battery SOC, time of day and charging rate to ensure reliable light mast 70 operation.

The firmware has a predictive capability with the lighting control algorithm being configured to depend on forecast or future predictions for environmental parameters, as described below, that can alter light mast 70 performance if not accounted for in the lighting control algorithm. Control system 200, with the involvement of the processing capacity of base station 250, calculates a lighting control algorithm which takes into account fixed data such as the geographic location including typical seasonal solar irradiation of the mobile solar power system and solar yield when deployed and sunset, sunrise, moonrise and moonset times for the location of the solar trailer 10 as well as time of day; and dynamic data such as weather forecasts for the location of the solar trailer; ambient light levels (as detected by the ambient light sensor); sensed and logged (and so learned) human motion patterns around the lighting apparatus as detected by the motion sensor; and logged performance data, in particular recent solar trailer 10 performance data (such as energy harvested compared to energy delivered as an efficiency measure). Such performance information may be compared between solar trailers of a fleet of solar trailers providing a diagnostic for possible faults with members of the solar trailer fleet and a need for maintenance. Such comparison also enables adjustment of the lighting control algorithm with the potential for incremental improvements which can substantially affect control system efficiency.

Ambient light and sensed motion data are logged and, if necessary, used by the remote controller 250 to modify software or firmware implemented by the local controller 220 to optimise light mast 70 operation. This can be done in real time. MCU 230 may also control light mast 70 operation based on measurement of detected ambient light by the ambient light sensor which is typically used as a basis for controlling light output from the LED luminaires of light mast 70. The ambient light sensor is located on the solar trailer 10 in a position exposed to ambient light but shielded from light from the LED luminaires of light mast 70 to avoid interference and less efficient operation of light mast 70.

The lighting control algorithm, based on these parameters, controls the start and end times for driving the lighting phase as well as delivered brightness of the LED luminaires of light mast 70 dependent on energy storage module parameters including, in the described embodiments, the state of charge of the batteries and battery charging behaviour and predicted energy yield. To that end, the lighting control algorithm includes light ramp-up and/or ramp down (with controlled ramp rate, if required, noting that ramping may include dwell periods at which light output is maintained at a constant level for a duration controlled by the control system 200) during sunset and sunrise (or other factors affecting charging behaviour or ambient light levels and requirement for light output, such as rainstorms and other weather events) to optimise energy storage module management.

The lighting control algorithm, though calculated using forecast parameters, may also be modified by control system 200 to take account of variances from the forecast or predicted environmental parameters, optionally in real time. For example, a weather forecast might predict that showers are possible during the day but persistent rain and darker conditions eventuate as detected by the ambient light sensor, reducing battery pack charging rate. The lighting control algorithm may then be updated in real time and the firmware also updated from base station 250 through the communications network to increase level of load shedding, LED luminaire dimming via PWM dimming, over that originally calculated. PWM dimming strategy may also be used to optimise available light output to power delivery since power delivery does not necessarily equate to light output. For example, the Applicant has found that 90% power (via PWM dimming) delivery to an LED luminaire does not represent 90% light output. This happens because an LED luminaire run at close to maximum output loses much energy through heat and so is less efficient. Therefore, adjusting the load shedding (PWM dimming) strategy to running LED luminaires at lower light output conserves energy without substantially affecting actual light availability.

In another scenario, the lighting control algorithm may predict cloudy weather with higher LED light output requirement. A bright moonlit night might eventuate, as detected by the ambient light sensor. The lighting control algorithm may be adapted to reduce light output, through PWM dimming, and conserve battery levels ahead of what is forecast to be stormy weather the next day where solar energy harvesting will be less. This scenario could also take into account the time of day, such that—if the SOC is low—but dawn is close, the level of PWM dimming can be adjusted. Though this may appear to provide a minor effect, it has a substantial influence on energy efficiency over time.

In yet another scenario, the lighting control algorithm may be based on limited personnel motion near the light mast 70 allowing it to be turned off or to a minimum light output level on a particular night. In the event, unexpected equipment maintenance eventuates and personnel are required in the area. Light mast 70 is required. This event may be logged through the administrative portal though, if considered to be a one off, may not be included within control system 200 determination of the lighting control algorithm. In contrast, if the maintenance activity is to continue over several nights—for example for roadworks that can extend over such a period—the lighting control algorithm can be programmed to take this into account and the firmware updated accordingly, possibly with date and time limits.

It will be understood that many such scenarios are possible and the lighting control algorithm, the firmware, can be updated to take account of them.

The lighting control algorithm may also take other special factors into account as described below.

The lighting control algorithm may also enable light mast 70 operation on an effective ON/OFF basis or an ON/OFF mode disabling the lighting control algorithm could be selected. For example, MCU 230 could trigger the LED drivers 72 to power the LED luminaires to provide a determined light level only when the motion sensor detects operator motion in the vicinity of the light mast 70.

Solar trailer 10 is, as described above, leased to a mining company by a solar trailer provider. The mining company is permitted to modify some operating parameters for solar trailer 10 through accessing the client web portal. Examples of such operating parameters include automatic light on off settings i.e. seasonally adjusted sunrise/sunset, specific time on/off, motion or ambient light, set/remove geofenced area, Firmware updates would be managed by the solar trailer provider through the admin web portal. This reduces prospects for error and optimises client use of the solar trailer 10 and its associated light mast 70, camera and communications antenna. The client and administrative (admin) portals may be accessed in any convenient manner, for example, through smartphones or other computer devices (tablet, laptop and so on) accessible through iOS and Android systems.

Control system 200 may optimise autonomous operation of light mast 70 in a number of ways. MCU 230 may control light output from the LED luminaires, through PWM dimming, as a function of the light level detected by the ambient light sensor and the light output requirement. Such PWM dimming may be determined to optimise available light output to power delivery as described above. Such operation reduces the rate at which battery charge depletes while still providing an acceptable light output. Light output from light mast 70 may be set as a function of client requirements.

For example, it may be necessary to provide no more than a selected light output (whether determined on the basis of colour, intensity and/or wavelength) to avoid detrimental impact on a wildlife habitat. In this case, light mast 70 may be fitted, by the operator, with LED luminaires of orange colour (wavelength 590 NM), driven by a 36V LED driver, rather than white colour to avoid detrimental impact on a wildlife habitat. The solar trailer 10 may be provided with an inventory of LED luminaires as required for system operation with the control system 200 and touch screen 270 indicating which type of LED luminaire (orange or white) should be used.

The control system 200 may also provide a geofence commanding a particular light colour or preventing use of a lighting apparatus too close—i.e. outside a geofence determined by the control system—to a sensitive habitat such as a turtle breeding habitat. Further, where the wildlife has determined reproductive periods, the control system 200 may predict this and set geofences or light output control measures within the lighting control algorithm, for example commanding a particular light output—during the determined reproductive periods which, for green and flatback turtles in the Port Curtis region are determined as follows:

| Species | Reproductive Period | Predicted Active Months |
| --- | --- | --- |
| Green turtle | Nesting | December-January |
|  | Hatching | February-March |
| Flatback turtle | Nesting | November-December |
|  | Hatching | February | and programmed into the control system 200 so that the light mast 70 can be operated in a manner reducing impact on turtle reproduction.

The light output may be tuned for control system 200 dependent on other factors which may reduce turtle susceptibility, especially hatchling susceptibility—for example predicted full-moon events within the reproductive periods where artificial lighting has less impact. The touch screen 270 may also inform an operator of the need for an LED luminaire colour change, in this case to orange (wavelength 590 NM), for wildlife protection purposes.

Further, the control system 200 may receive inputs from a communications device, such as an RFID device. If operators working in the vicinity of light mast 70 are provided with RFID devices showing their authorisation to be in that area, the control system 200 may control light output in line with identification data tied to the RFID device. So a first operator may be identified by an RFID device as someone needing to pass close to the light mast 70 without having to perform any special task. Control system 200 may then control light mast 70 to provide a first light output level sufficient to allow the first operator a safe level of light. If a second operator is identified as having to perform a special task, such as a maintenance task on an equipment item which can be illuminated by the light mast 70, then control system 200 may command LED drivers to output a second light output level greater than the first light output level.

Operation of the solar trailer 10 to supply power to light mast 70 under control of control system 200 will now be described.

Solar trailer 10 is towed by a suitable towing vehicle (not shown) to the required location for the light mast 70. The towing vehicle has an output device communicating with the control system 200 which may provide direction from a logistics system to assist the driver of the towing vehicle in reaching the desired location.

The solar panel assembly 30 is closed or in storage position during transit, storage position being shown in FIG. 1. In storage position, the solar panel assembly 30 is locked into a closed position by a set of spring-loaded locking pins, locking pins being located at the top of the stored solar panel assembly 30 and the other locking pins being located at the bottom of the stored solar panel assembly 30. Secured storage position of the solar panel assembly 30 may be sensed by a reed switch or similar sensor sensing the position of the locking pins communicating with control system 200 and an alarm is triggered for the driver if the secured storage position is lost.

When the solar trailer 10 reaches the required location for light mast 70, it is secured into position by the stays 115 as shown in FIGS. 1 to 3. Solar panel assembly 30 is deployed in electrical connection via the battery rack with the LED luminaires of light mast 70 so that the solar panels 40, 42 and 44 collect solar energy for conversion into electric power. The solar panel assembly 30 is deployed in the manner described in the Applicant's International Publication No. WO 2021/119733 incorporated herein by reference for all purposes. As described above, the solar trailer 10 has an inbuilt compass orientation device and a GPS location device which reports solar panel assembly 30 orientation information to microprocessor 240. If the orientation is incorrect for the detected GPS location (which should also correspond with the required position for light mast 70), the operator deploying the solar panel assembly 30 is informed and can take corrective action.

Deployed position of solar panels 40, 42 and 44 may also be sensed by proximity sensor (or other suitable sensor) and communicated to control system 200.

As described above, the solar trailer 10 can be operated in one of a plurality of selectable modes. Conveniently, the operator selects an automatic mode of operation for the solar trailer 10 through appropriate command input at touch screen 270. The control system 200 may prevent—with detection of solar panel assembly position (stored or deployed)—selection of automatic mode without deployment of the solar panel assembly 30. Alternatively, an alarm may be triggered and the operator informed to take corrective action.

The solar trailer 10 is then operated to provide power to light mast 70 and auxiliary loads (camera and communications antenna) through the control system 200 executing a control strategy as described above.

Events, such as a need for a battery change or different times for camera operation, may occur during the operation of the solar trailer 10. Need for battery change can be indicated on the touch screen 270 and the operator can take steps to swap a battery pack 62 as described above. This event can be logged and reported to base station 250 as necessary. In the case of a change in a camera parameter, such as camera operating time, control system 200 may allow client personnel to modify this through entering the required camera operating time through the admin portal, for example using a smartphone or the included touch screen (HMI) 270 as shown in FIG. 4 to access the admin portal. LED brightness or light output level is a parameter that could be adjusted manually by the operator, conveniently accessing the touch screen to do so, or by the client—again through using the admin portal. The touch screen 270 may display client selection of brightness level to inform the operator as well.

Throughout this specification, unless the context requires otherwise, the word "comprise" or variations such as "comprises" or "comprising", will be understood to imply the inclusion of a stated integer or group of integers but not the exclusion of any other integer or group of integers.

Modifications and variations to the mobile solar power unit control system described in this specification may be apparent to the skilled reader. Such modifications and variations are deemed within the scope of the present invention.

The invention claimed is:

1. A mobile solar power unit control system providing power to an associated equipment item, the mobile solar power unit control system comprising:
   (a) at least one mobile solar power unit comprising a solar panel assembly of including a plurality of inter-connected planar solar collector panels, each solar collector panel not being shaded by another solar collector panel of said plurality;
   (b) an energy storage module comprising at least one battery connected to receive power from the solar panel assembly of inter-connected planar solar collector panels; and
   (c) a control system for controlling operation of both the energy storage module of the at least one mobile solar power unit and associated equipment item,
   wherein said control system comprises a local controller having a human machine interface onboard or proximate the at least one mobile solar power unit and a remote controller located remotely from said at least one mobile solar power unit;
   wherein said remote controller is communicable with said local controller through a wireless communications network for controlling, by a control algorithm configured by said remote controller and transmitted to said local controller, operation of the mobile solar power unit, its associated equipment item(s) and any auxiliary loads;
   wherein said control algorithm is configured dependent on information resources collating information about an environment surrounding the at least one mobile solar power unit and processing of data collected from the at least one mobile solar power unit;
   wherein start and end times for said associated equipment item operation are automatically adjustable in real time by said control algorithm dependent on:
   a plurality of environmental parameters including predicted environmental parameters selected from the group consisting of information fixed by location including geographic location of the mobile solar power unit and sunset, sunrise, moonrise and moonset times for the location of the at least one mobile solar power unit; and dynamic information selected from the group consisting of weather forecasts for the location of the at least one mobile solar power unit, ambient light levels, sensed and logged human motion patterns around the at least one mobile solar power unit, and logged mobile solar panel unit performance data; and wherein said control algorithm takes account of variances from predicted environmental parameters in operating the associated equipment item.

2. The control system of claim 1, wherein said local controller implements the control algorithm configured and transmitted by the remote controller for operating said at least one mobile solar power unit and associated equipment item said control algorithm being accessible by the local controller from a cloud server which enables updates for configuring the control algorithm for controlling said mobile solar power unit and associated equipment item as a function of operating performance and environmental factors processed by the remote controller.

3. The control system of claim 2, wherein a client portal is provided to enable a user of said at least one mobile solar power unit to modify selected operating parameters for mobile solar power unit operation; and the control system optimises performance of the mobile solar power unit.

4. The control system of claim 1, wherein said control algorithm as embodied in software or firmware for operating the mobile solar power unit has a predictive capability with software being modified as a result of comparing expected operating results with actual operating results for mobile solar power unit(s) and/or as a result of relating desired associated equipment item performance with current and/or forecast or future predictions for environmental parameters that can alter mobile solar power unit performance if not accounted for by the control system.

5. The control system of claim 1, wherein the control system acquires, where communicated with selected sensor (s), data about current or real time operation of one or a system of mobile solar power unit(s) with said data being logged and used by the remote controller to modify software or firmware embodied in the control algorithm implemented by the local controller to optimise mobile solar power unit operation.

6. The control system of claim 1, wherein said associated equipment item is a lighting apparatus.

7. The control system of claim 6, wherein light is provided by the lighting apparatus during a lighting phase by a plurality of LED luminaires controlled through LED drivers by the control system.

8. The control system of claim 7, wherein the control system controls the start and end times for the lighting phase relative to timer(s) or ambient light levels and dependent on energy storage module parameters including the state of charge of the batteries.

9. The control system of claim 7, wherein the control system determines load shedding behaviour for the lighting apparatus dependent on energy storage module parameters selected from the group consisting of state of charge (SOC); and voltage deliverable from the solar panel assembly; and other factors selected from the group consisting of time of day, weather forecasts and the configuration of the solar panel assembly or energy storage module of a selected mobile solar panel unit and the control system implements a lighting control algorithm for the LED driver(s) to optimise light output.

10. The control system of claim 9, wherein the lighting control algorithm includes slight ramp-up and/or ramp down with controlled ramp rate to conserve battery storage levels.

11. The control system of claim 9, wherein the lighting control algorithm implements pulse width modulation (PWM) control over dimming to optimise available light output to power delivery.

12. The control system of claim 1, wherein said environmental parameters further include estimated or measured properties of the solar panels being dirt or dust build up or related drop in efficiency over time.

13. The control system of claim 1, wherein the control algorithm for the associated equipment item takes account of variances from predicted environmental parameters in real time.

14. The control system of claim 6, further comprising controlling light output to a selected light output whether determined in terms of light intensity or light wavelength or indicating that a certain light colour or light wavelength be used for the lighting apparatus.

15. The control system of claim 14, wherein the lighting apparatus includes LED luminaires, with selected LED drivers to enable production of light at a desired wavelength to avoid detrimental impact on a wildlife habitat.

16. The control system of claim 1, providing a geofence indicating use of a particular light wavelength or preventing use of a lighting apparatus too close to a sensitive wildlife habitat.

17. The control system of claim 16, wherein the wildlife has determined reproductive periods and the control system determines a lighting control algorithm including setting of geofences or light output control measures by commanding a particular colour or light output during the determined reproductive periods.

18. The control system of claim 1, wherein operational data is communicated from said at least one mobile solar power unit to the remote controller with cloud-based data aggregation and hosting allowing web-based monitoring of operational data for optimising mobile solar power unit performance.

19. The control system of claim 18, wherein implementation of a web interface allows for actions including an action selected from the group consisting of: remote reconfiguration of operating parameters; review of historic charge/discharge performance; review of solar power unit fleet placement and geolocation (current and historical); solar power unit fleet assignment; performance forecasts; and emergency shutdown.

20. The control system of claim 1, wherein the remote controller is configured to execute an action onboard the mobile solar power unit exclusively of the operator and local controller.

21. The control system of claim 1, wherein a local operator is enabled to interact with the control system for a selected mobile solar panel unit to manually control its operation within limited conditions programmed into the control system by manually adjusting permitted operating parameters.

22. The control system of claim 1, wherein the local controller is selected for energy storage module control, the remote controller modifying operation of the local controller or overriding the local controller under certain operating conditions.

23. The control system of claim 22, wherein the local controller includes a battery management system with maximum power point tracking (MPPT) control module(s), an MPPT control module being individually provided for each solar panel.

24. The control system of claim 1, including one or more sensors connected-whether through wireless or wired connections—to the control system, said sensor(s) being selected for detecting environmental and system conditions selected from the group consisting of ambient light level and ambient temperature, solar panel reflectivity, energy storage module temperatures and other mobile solar power unit operational data required for the control system to optimise mobile solar power unit(s) operation.

25. The control system of claim 1, wherein said associated equipment item is provided with DC power.

26. The control system of claim 1, wherein the energy storage module supplies power to auxiliary loads selected from the group consisting of communications equipment and cameras controlled by the control system.

27. The control system of claim 25, wherein, where DC electricity derived from the solar panel assembly and an associated battery rack is not correctly matched with power requirements for the associated equipment item or selected auxiliary loads, DC-DC converter(s) whether of boost, buck or buck-boost type are included within the local controller to enable efficient matching of available power to the load requirements including any required constant voltage requirement.

28. The control system of claim 27, wherein a separate DC-DC converter or system of DC-DC converters is provided for each auxiliary load requiring a constant voltage.

29. The control system of claim 1, comprising a plurality of mobile solar power units.

30. A mobile solar power unit control system comprising:
(a) a plurality of mobile solar power units, each mobile solar power unit comprising:
  (i) a solar panel assembly of a plurality of inter-connected planar solar collector panels;
  (ii) an energy storage module comprising at least one battery connected to receive power from the solar panel assembly of inter-connected planar solar collector panels; and
  (iii) an associated equipment item drawing power from the energy storage module; and
(b) a control system for controlling operation of the plurality of mobile solar power units and associated equipment items, the control system comprising:
  (i) a local controller having a human machine interface, said local controller being located onboard or proximate each mobile solar power unit; and
  (ii) a remote controller, communicable with each local controller through a wireless communications network, located remotely from the plurality of mobile solar power units,
wherein said remote controller controls each mobile solar power unit, its associated equipment item(s) and any auxiliary loads through processing of data collected from the plurality of mobile solar power units and information resources collating information about an environment surrounding each mobile solar power unit; and
wherein each local controller is selected for energy storage module control, the remote controller modifying operation of the local controller under certain operating conditions.

* * * * *